Oct. 31, 1933.                J. A. RATTA                1,932,602
                           ELECTRIC CABLE BOND
                           Filed April 21, 1932
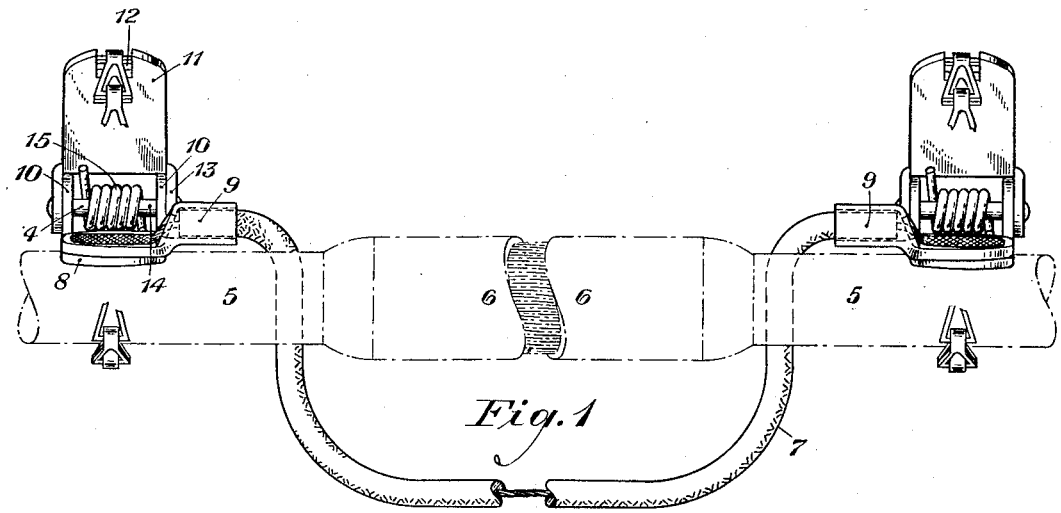
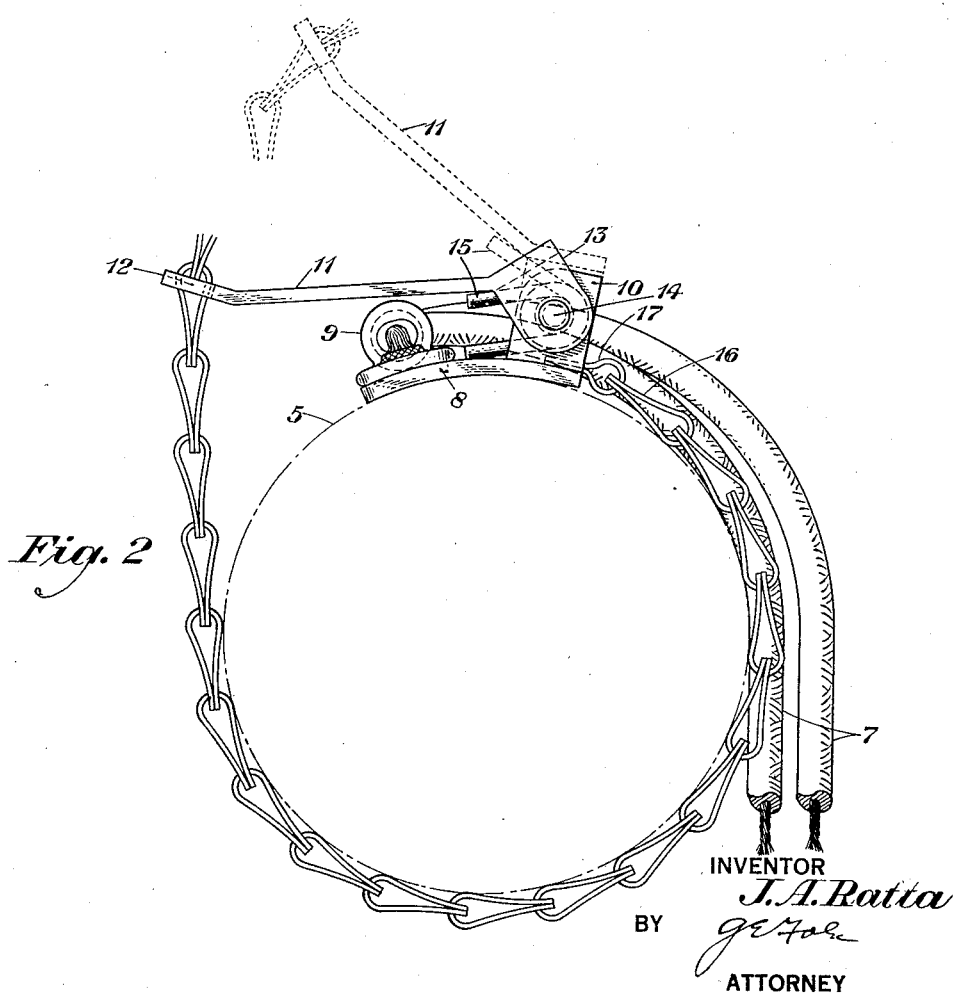
INVENTOR
J. A. Ratta
BY
ATTORNEY Patented Oct. 31, 1933

1,932,602

UNITED STATES PATENT OFFICE 1,932,602

ELECTRIC CABLE BOND

James A. Ratta, Brooklyn, N. Y., assignor to American Telephone and Telegraph Company, a corporation of New York Application April 21, 1932. Serial No. 606,728

1 Claim. (Cl. 173—273)

This invention relates to improvements in electric cable bonds, an object of the invention being to provide a bond for temporarily bridging across openings in cable sheaths so that the continuity of the electrical circuit formed by the sheath of a cable will not be broken when a portion of the sheath is removed for performing splicing, maintenance or other operations.

Briefly described, the invention comprises spring clamps for frictionally engaging a cable sheath, these clamps being interconnected with each other by means of a flexible cable.

The novel features which are considered characteristic of the invention are set forth with particularity in the appended claims. The invention itself, both as to organization and method of operation, together with other objects and advantages thereof, will be further explained in the following detailed description having reference to the accompanying drawing, consisting of the following figures:

Figure 1 shows the improved arrangement applied to a cable;

Fig. 2 is an end view of Fig. 1, illustrating the device in clamped position about a cable in full lines, and showing said device in normal or released position in dotted lines.

Referring to the drawing, the sheath of a cable 5, to which the improved bond is to be attached, is shown as having an open or cut-away portion at a joint 6. It will be understood that this open portion may be located at any point of a cable sheath. In practice, this portion of the sheath is removed for the purpose of performing splicing or maintenance operations at this point. The electrical circuit normally provided by the sheath will be broken under this condition, and, as it is necessary that the continuity of such circuit be maintained, a bond is bridged across the opening in the cable sheath during this period.

In accordance with this invention, clamps of the improved cable bond are attached to the cable sheath 5 on each side of the opening in a manner which will be presently described. These clamps are interconnected by means of the flexible cable 7. The clamps are provided with an arcuate-shaped clip or saddle member 8 which is bent to conform to the curvature of the cable sheath upon which it is seated when the clamps are in position. Each end of the flexible cable 7 passes through a terminal sleeve 9 and said conductor and sleeve are soldered or otherwise attached to a face of the saddle member near one of its ends. Lugs 10 are bent from the edges at the opposite ends of the saddle members 8 and extend outwardly at right angles thereto. Each of the clamps is provided with an additional plate 11, which are of greater length than the saddle members 8. One of the extremities of the plates 11 is bent outwardly, and slots 12 of substantially U-shaped formation are provided therein. The opposite ends of the plates 11 are provided with lugs 13 which are bent inwardly and overlap corresponding lugs 10 on the saddle members 8. A transversely positioned rod 14 extends through coinciding openings in each companion pair of lugs 10 and 13, and this rod serves as an axis about which the plates 8 and 11 may be rotated. Tension means, such for instance, as coiled or helical springs designated by the numerals 15, are provided about the rods 14 and are shown with one of their ends bearing against the inner faces of the members 8 and the other ends bearing against the inner faces of the plates 11. The springs thus exert pressure against the members 8 and 11 and normally hold their outer ends in separated relation. A chain 16 is attached by one of its ends 17 to each of the members 8 and the other portion of the chain is wrapped tightly around the cable sheath 5, and the free end of the chain is inserted in and engaged by the slot 12 of the plate 11.

In the application of a clamp to the cable sheath the plate 11 is moved from its normal position as indicated by the dotted lines in Fig. 2 to the compressed position indicated by full lines in said figure. In this latter position when the chain is drawn tightly about the sheath and the free end of the chain is caused to engage in the retaining slot 12 of the plate 11, the tension exerted by the spring 15 will maintain the clamp securely in position on the cable sheath and insure satisfactory electrical contact therewith. The two clamps being interconnected by the flexible cable and secured to the separated portions of the cable sheath in the manner above outlined, will provide a path across the opening in the cable sheath so that the continuity of the electrical circuit between the two portions will be effectively maintained. The clamps are adapted to fit all sizes of electric cables and cable sleeves.

What is claimed is:

A temporary bond for providing a path for current between separated portions of a cable sheath, said bond including a conductor, and clamping means at each end of said conductor for establishing positive conductive contact with each of the separated portions of the sheath, said clamping means including a saddle member affixed to the end of said conductor and adapted to rest upon the sheath, a flexible member attached to said saddle member and adapted to be looped about the sheath, an attaching member hinged at one end to said saddle member and having a retaining slot at its free end, and resilient means comprising a coiled spring surrounding the axis of the hinge and having terminating portions engaging the saddle member and attaching member, respectively, and tending to separate the ends of said members, the free end of said flexible member being adapted to be adjustably engaged with the retaining slot of said attaching member and being bound tightly around said sheath by the tension of said resilient means.

JAMES A. RATTA.